United States Patent

Garnier, Jr.

[15] 3,686,468

[45] Aug. 22, 1972

[54] MAGNETIC TRANSDUCER HAVING TWO CORE MEMBERS OF DISTINCTLY DIFFERENT MAGNETIC FIELD CARRYING CHARACTERISTICS

[72] Inventor: Robert C. Garnier, Jr., 9611 W. Lorraine Place, Milwaukee, Wis. 53222

[22] Filed: Sept. 15, 1969

[21] Appl. No.: 857,763

[52] U.S. Cl ....................................179/100.2 C, 179/100.1 B, 179/100.3 E

[51] Int. Cl...........G11b 5/14, G11b 7/12, G11b 9/00

[58] Field of Search..........179/100.2 C; 340/174.1 F; 346/74 MC

[56] References Cited

UNITED STATES PATENTS

| | | | |
|---|---|---|---|
| 3,314,056 | 4/1967 | Lawrance | 179/100.2 C |
| 3,187,335 | 6/1965 | Fay | 346/74 MC |

OTHER PUBLICATIONS

DiMarco, " Ferrite Transducing Head With Transmutive Portion," I.B.M. Tech. Disc. Bull., Vol. 7, No. 9, Feb. 1965, Pg. 771.

*Primary Examiner*—Bernard Konick
*Assistant Examiner*—Robert S. Tupper
*Attorney*—Andrus, Sceales, Starke & Sawall

[57] ABSTRACT

An energy transducer includes a pair of abutting core members with highly finished surfaces at the junction between the members. The members are formed of a similar material having differing field intensity support capacity. For a magnetic energy transducer, the two members would have substantially different permeabilities. The two core members would have a similar flux density resulting in distinctly different field intensities in each of the members in order to establish and maintain the corresponding flux density. The difference in field intensity tends to establish a step function change at the junction. As the field cannot change abruptly, a high field concentration appears at the junction immediately adjacent the outer surface of the members which can be recorded on a passing magnetic tape.

3 Claims, 6 Drawing Figures

Patented Aug. 22, 1972 3,686,468

INVENTOR.
ROBERT C. GARNIER, JR.
BY
Andrus, Sceales, Starke, & Sawall
Attorneys

MAGNETIC TRANSDUCER HAVING TWO CORE MEMBERS OF DISTINCTLY DIFFERENT MAGNETIC FIELD CARRYING CHARACTERISTICS

BACKGROUND OF INVENTION

This invention relates to a field intensity transducer which is adapted to transfer information or power from a storage medium by the relative movement between the transducer and the storage medium.

Information is often stored in a form other than written for subsequent mechanical or electrical recovery. An example of such is magnetic recording which is widely employed for storing of information for subsequent recovery. Generally, a magnetic transducer head is provided which is moved relative to a magnetic tape or other material of a proper permeability. Generally, such heads are formed with a particular air gap such that flux introduced into the core as by a winding or the like results in flux lines through the air gap which project outwardly from the air gap and provide energy into the path of the magnetic tape. For recording, the characteristic of the flux is varied in accordance with the information to be stored. The fringing flux lines thereby vary in a predetermined manner and control the magnetization of the magnetic tape as it is moved past the head. To recover the information, the tape is moved past the head and the magnetic flux established by the recorded information on the tape results in a corresponding change of the flux in the head which may be recovered by a suitable output coil. It has long been recognized that the formation of the air gap or its equivalent is critical and is preferably established and maintained by a non-magnetic spacer as by insertion of a non-magnetic shim, or the like alternatively, on a side coating to one or both of the members. The proper formation of the air gap with the non-magnetic spacer properly held within the head results in a rather expensive and time-consuming process. Relatively close tolerances must be obtained and the spacer must be rigidly fixed within the assembly. Furthermore, if the spacer is destroyed, the head loses the capability of properly functioning as a recording, erase, or playback device. For example, it has been suggested that rather than the forming of a distinct air gap, a solid magnetic core material be treated in a very limited narrow region to decrease the permeability in that region, and thereby establish an effective air gap. Such a system will eliminate the problem of formation of the separate machine surfaces and the insertion of a separate air gap. It correspondingly requires the separate formation and treating of a very limited region of a magnetic member to produce the desired effective air gap.

SUMMARY OF INVENTION

The present invention is particularly directed to an improved field transducer employing the intensity of a control field established across the junction of a pair of abutting members having a virtual or actual boundary or junction between the members with the material to the opposite sides thereof being essentially similar but of a differing field intensity supporting capacity for the purpose of redirecting power or data, as well as other control or transfer function.

Generally, in accordance with a particularly novel aspect of the present invention, a pair of generally like members are provided with planar abutting surfaces having highly finished end surfaces. The two members are formed of a relatively different composition with respect to the particular field medium being employed; for example, magnetic, electrical, thermal, current, light, acoustical or the like. In particular, the two members are selected such that the flux density in the two members is essentially, but not necessarily exactly, the same. The characteristics of the material is such that there are distinctly different field intensities in each of the members in order to establish and maintain the corresponding flux density. The difference in field intensity, therefore, would tend to form essentially as a step function change at the boundary-abutted members. As the field cannot change abruptly, a high field concentration appears at the abutment immediately adjacent the outer surface of the members. The invention has been particularly constructed to employ a magnetic field intensity concept. The two halves of a head were selected of the materials having substantially different permeability and were mounted with planar opposed surfaces secured in an abutting relationship. A recording coil was coupled to the head and information in the form of electrical energization of the coil applied thereto. A magnetic tape was moved past the junction of the members. The clamped direct abutted surfaces established a varying magnetic field intensity immediately at the abutment that properly magnetized the tape.

Generally, as the concept of field density and intensity with different mediums are analogous, the present invention can be applied to other types of fields. By the selection of proper similar materials, but of different characteristics that will support a chosen field, the invention might employ an electric field, a current field, a thermal field, a light field, a sound field and the like.

BRIEF DESCRIPTION OF DRAWING

The drawing furnished herewith illustrates the best modes presently contemplated by the inventor for carrying out the subject invention.

Figure 1:
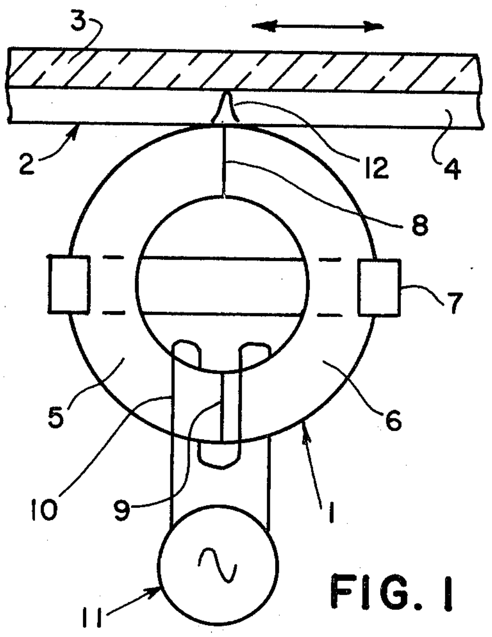
FIG. 1 illustrates a magnetic transducer constructed in accordance with the present invention.

Referring to the drawing and particularly to FIG. 1 a magnetic recording and playback transducer or head 1 constructed in accordance with the present invention is illustrated connected for recording of a magnetic signal on a suitable tape 2. The illustrated tape is shown having a tape backing 3 with a suitable magnetic oxide material coating 4 on the surface. The tape 2 is movable with respect to the head 1 with the magnetic coating 4 immediately adjacent the head.

In accordance with the present invention, the head includes a dual element core which is illustrated as a generally circular or doughnut-shaped core element. It is formed of a pair of similar semi-circular members 5 and 6 having planar corresponding ends. The members 5 and 6 are held in abutting relationship in any suitable manner such as by a mechanical clamping member 7. The abutted joints 8 and 9 defined by the planar ends establish an essentially continuous gapless path. Thus, the ends of members 5 and 6 are formed with a relatively high degree of finish such that they provide an essentially complete physical abutment to particularly minimize any air or oxide gap therebetween such as specially introduced in the usual construction. The head 1 is mounted with the one abutted joint 8 positioned immediately adjacent to the tape 2 and with the abutted joint 8 extending transversely across the tape. An input winding 10 is wound about the core such as at the diametrically opposite abutting joint 9 and is interconnected to a suitable signal source 11.

Figure 2:
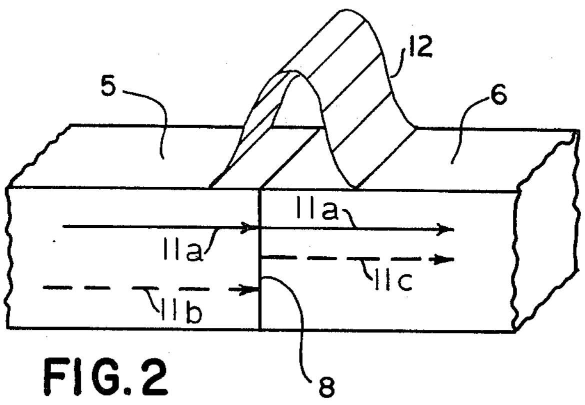
FIG. 2 is an enlarged fragmentary view of a head illustrating the operation of the transducer.

The two members 5 and 6 are formed of a generally similar magnetic material; for example, known ferrite. However, the members 5 and 6 are treated in any known manner or of a selected different composition such that one has a distinctly different permeability with respect to the other. For example, it may be assumed that the element 5 has a distinctly higher permeability than that of element 6. The members 5 and 6 are energized from winding 10 to establish equal magnetic field densities in the two members. As the magnetic field density is related to the magnetic field intensity in accordance with the permeability, this will result in a substantially higher field intensity in the member 6 of lower permeability. The flux density is diagrammatically illustrated in FIG. 2 by the similar aligned arrows 11*a*. Thus, if the permeability of the member 5 is twice the permeability of the other member 6, the field intensity in the member 5 will be one-half the field intensity in the second member 6, as diagrammatically illustrated by the intensity level areas 11*b* and 11*c*. In equation form, $B = \mu H$ where B is the flux density, $\mu$ is the permeability and H the field intensity. For equal or nearly equal densities, $B = \mu_5 H_5 = \mu_6 H_6$ and $H_5 = (\mu_6/\mu_5)H_6$. In the assumed example, $H_5$ equals one-half $H_6$. As an instantaneous change in a field intensity cannot occur as a natural phenomena, as shown by lines 11*b* and 11*c*, the field intensity must change in some other manner. It would appear that the attempted stepped change results in the external field intensity at the abutting joint 8 which extends outwardly about the abutting joint generally as diagrammatically shown at 12 in FIGS. 1 and 2. The concentrated magnetic field intensity 12 appears as a relatively rapidly increasing and decreasing amplitude signal projected outwardly across the abutted joint 8. Furthermore, the magnitude of this magnetic field intensity will be related directly to the amplitude of the signal source, which may or may not include a biased level derived from an alternating current or direct current source. Thus, by varying the signal source, a corresponding signal is applied to the magnetic coating 4. As a magnetic field has an associated field intensity, an electric field sensing means might also be employed.

The generation of the signal by the direct abutting member results in a concentrated signal field, with a minimizing of tape noise and the like normally associated with magnetic recordings. The direct abutment of the two magnetic members has been found to provide a satisfactory head unit without the problems of gap construction. As the head operates as a result of the difference in the characteristics of the two parts, they may, within the broadest aspect, be a single member or two joined members if the characteristic difference can be established or maintained across the junction of the two materials.

The head may be employed, of course, for playback or erase by connecting of a suitable pickup coil and response device to the core structure. By analogy, the same device can, indeed, be employed with different energy fields. For example, in FIG. 3 an electrostatic head is shown which might be employed for recording, playback, erasure and the like.

Figure 3:
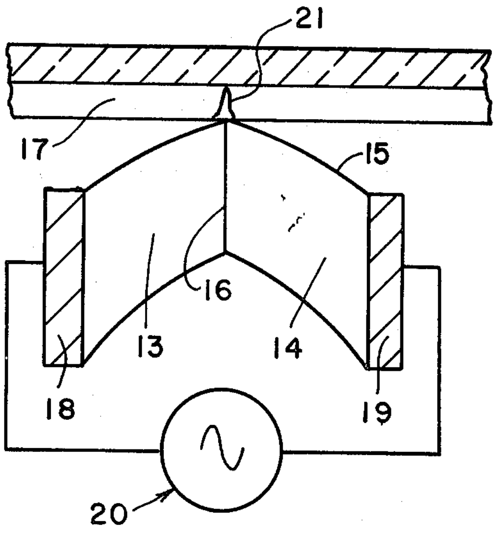
FIG. 3 is a view similar to FIG. 1 illustrating an electrostatic head.

In FIG. 3, a pair of abutting block members 13 and 14 are provided, formed of similar material capable of supporting electric fields, but of substantially different permitivities. In the illustrated embodiment of the invention, the abutting members 13 and 14 are formed such as with a generally curved upper head 15 with the junction or abutted joint 16 immediately adjacent an electrostatic recording tape 17 such as a dielectric material applied to the surface of a tape backing. Metal contact plates 18 and 19 are secured to the opposite end faces of the abutting block members 13 and 14 to define a pair of spaced field plates, and thereby defining a transducer head. The plates in turn are connected to a suitable electrical signal source 20 which is adapted to establish a voltage across the parallel plates in accordance with information to be recorded on tape 17. A corresponding electrostatic field density is established in the two abutting block members 13 and 14 which by analogy require distinctly different electric field intensities in the two abutting block members. As the field intensity cannot change abruptly, a concentrated electric field pattern 21 will appear at the abutting junctions for purposes of transducing the signal onto the recording dielectric. The same effect would appear if the materials were semi-conductors of the same basic type but doped to a different level with the carrier impurity.

Figure 4:
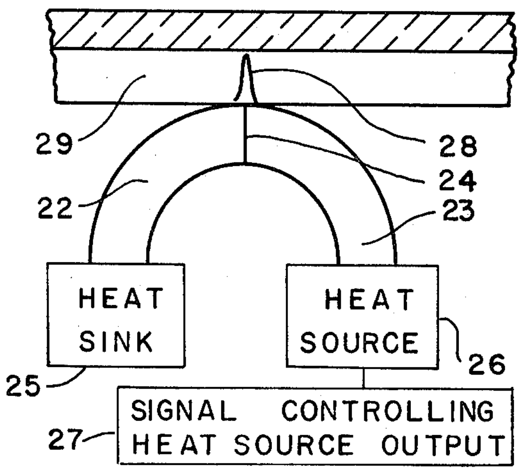
FIG. 4 is a view similar to FIGS. 1 and 2 illustrating a thermal transducer.

In FIG. 4, a thermal unit is illustrated based on a corresponding phenomena. In FIG. 4, a pair of abutting members such as the quarter section curved members 22 and 23 are provided having planar abutting faces defining a transducer joint 24. The abutting members 22 and 23 are generally of a similar material selected to have a distinctly different thermal conductivity. For example, one member might be formed of aluminum or steel and the other member of copper. A thermal potential source 25 is applied to the outer end of the member 22. A potential source 26 which includes an adjustable means 27 is applied to the outer end of member 23 for varying the relative thermal potential. This provides a means of varying the energy applied to the corresponding members. Once again, by establishing a similar density, a different field intensity level is established at the joint 24. This will result in a concentrated heat pattern 28 projecting outwardly from the abutted joint 24 which may be transferred to a recording member 29.

It should be noted that the termo device shown in FIG. 4 may be illustrative of an electrical device relying on the difference in current conductivities of a pair of abutting members. Thus, if the abutting members 22 and 23 are formed of similar material having substantially different electrical conductivities, a concentrated electrical field will result at the abutting joint, if the members are energized to establish a corresponding current density.

Figure 5:
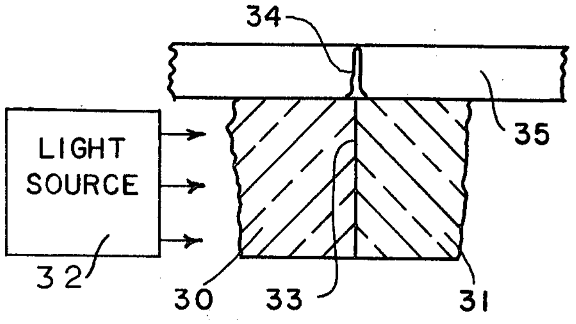
FIG. 5 illustrates an optical transducer.

In FIG. 5, still further embodiment of the invention is illustrated employing an optical energy concept. In FIG. 5 a pair of abutting members 30 and 31 are mounted in a coaxial abutting relationship. A light source 32 establishes light passing through the abutted members 30 and 31. The one member 30 is provided with a different light carrying capability; for example, a difference in the opaqueness. In addition, a light shield such as a black coating, not shown, may be provided over the outer periphery of the members 30 and 31 to prevent lateral introduction and removal of light. By the energizing of the two abutting members to establish a similar light density in the two members, they will necessarily be energized with a different light intensity which tends to change as a step function at the abutting joint 33. As the intensity cannot change abruptly, a concentrated light pattern 34 will occur at the abutted joint 33, which can be recorded onto a transferring medium 35 such as film.

Figure 6:
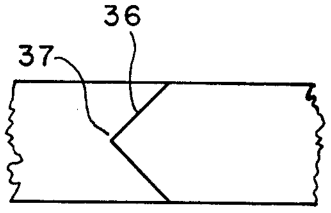
FIG. 6 illustrates a modification to the abutting surface configuration.

The embodiments of FIGS. 1 – 5 include flat, planar abutted joints. The surfaces may, of course, be formed with differing configurations. For example, as illustrated in FIG. 6, the surfaces are shown as V-shaped and define a V-shaped joint 36 having a distinct point 37. Generally, a field will exist across the joint 36 with an increased potential at the junction point 37.

Although the invention has been illustrated in connection with a concept related to recording the signal at the abutting joint, it may, of course, be employed in other applications where a control function, a directive function, or an emphasis function is desired. For example, an appropriate switch means may be controlled by the signal field.

Thus, the present invention provides a relatively direct, simple and inexpensive transducer which can be employed in a recording, energy or other control system.

I claim:

1. An information transducer employing a magnetic energy field, comprising a first core member having a smooth contact surface, a second similar core portion having a corresponding smooth contact surface, said first and second core members mounted with said surfaces abutting and defining a distinct transducing junction and each of said core portions being formed of material carrying the magnetic energy field and having distinctly different magnetic field carrying characteristic, means firmly supporting said members in abutting relation to essentially eliminate any gap between said separate members at said junction, magnetic field source means coupled to said core portions to directly establish said magnetic energy fields in said core portions and establishing a high intensity magnetic field at the junction.

2. The information transducer of claim 1 wherein said end surfaces are planar surfaces.

3. The information transducer of claim 1 wherein said members are similar ferrite core members of a distinctly different permeability defining an essentially closed magnetic path.

* * * * *